(12) United States Patent
Anderson

(10) Patent No.: US 8,318,008 B1
(45) Date of Patent: Nov. 27, 2012

(54) MODULAR INDIVIDUAL WASTEWATER NUTRIENT REMOVAL SYSTEM

(75) Inventor: Steven M. Anderson, Butte, MT (US)

(73) Assignee: SepticNet, Inc., Butte, MT (US)

( * ) Notice: Subject to any disclaimer, the term of this patent is extended or adjusted under 35 U.S.C. 154(b) by 681 days.

(21) Appl. No.: 12/542,595

(22) Filed: Aug. 17, 2009

Related U.S. Application Data

(60) Provisional application No. 61/089,119, filed on Aug. 15, 2008, provisional application No. 61/090,290, filed on Aug. 20, 2008.

(51) Int. Cl.
*B01D 21/24* (2006.01)

(52) U.S. Cl. .................. 210/137; 210/195.3; 210/220

(58) Field of Classification Search .............. 210/137, 210/630, 195.3, 220, 252, 534
See application file for complete search history.

(56) References Cited

U.S. PATENT DOCUMENTS

| | | | |
|---|---|---|---|
| 5,318,699 A | 6/1994 | Robertson | |
| 5,342,522 A | 8/1994 | Marsman | |
| 6,187,183 B1 | 2/2001 | Weaver | |
| 6,372,137 B1 | 4/2002 | Bounds | |
| 6,444,126 B1 | 9/2002 | Gates | |
| 6,582,596 B2 | 6/2003 | Mao | |
| 6,620,322 B1 * | 9/2003 | Vesio et al. | 210/605 |
| 6,818,581 B2 | 11/2004 | Pasquale | |
| 6,936,170 B2 | 8/2005 | Shieh | |
| 6,946,073 B2 | 9/2005 | Daigger | |
| 7,008,538 B2 | 3/2006 | Kasparian | |
| 7,077,952 B2 | 7/2006 | Burks | |
| 7,081,203 B2 | 7/2006 | Helm | |
| 7,082,893 B2 | 8/2006 | Schreier | |
| 7,144,509 B2 | 12/2006 | Boyd | |
| 7,147,776 B2 | 12/2006 | Krier | |
| 7,297,276 B2 | 11/2007 | Tokutomi | |
| 7,332,077 B2 | 2/2008 | Pollock | |
| 7,407,580 B2 | 8/2008 | You | |

(Continued)

FOREIGN PATENT DOCUMENTS

JP 54107153 2/1978

(Continued)

OTHER PUBLICATIONS

Hu, Treatment of Wastewater with Modified Sequencing Batch Biofilm Reactor Technology,J. or Shanghai University, 2002, 6(3): 284-254.

*Primary Examiner* — Terry Cecil
(74) *Attorney, Agent, or Firm* — Jean Kyle

(57) ABSTRACT

A modular, on-site, wastewater treatment system removes total nitrogen, phosphorus, BOD, and TSS. A flow equalization module provides a constant flow rate to the system eliminating the adverse effects from variations in flow rate throughout the day. Treatment modules are similarly sized to provide a compact, modular system. The nitrification module is a fixed-film, flooded packed bioreactor to facilitate bioconversion of ammonia to nitrate. Aeration of the module provides the oxygen needed for the bioconversion as well prevents clogging of the film. Solids from the nitrification process are removed in a first cone-shaped settling tank. Denitrification where nitrate is converted to nitrogen gas takes place in an anaerobic fixed-film bioreactor. Carbon-based bio-film carriers provide a carbon source for de-nitrification. A final cone-shaped settling tank separates solids from the treated wastewater. Additional modules to address removal of phosphorous or other contaminants can be added to the modular system.

20 Claims, 8 Drawing Sheets

U.S. PATENT DOCUMENTS

| | | |
|---|---|---|
| 7,445,715 B2 | 11/2008 | Pehrson |
| 7,462,285 B2 | 12/2008 | Wickham |
| 7,485,228 B2 | 2/2009 | Herding |
| 2004/0035770 A1 * | 2/2004 | Edwards et al. ............. 210/137 |
| 2008/0156726 A1 | 7/2008 | Fassbender |
| 2008/0210610 A1 | 9/2008 | Whiteman |

FOREIGN PATENT DOCUMENTS

| | | |
|---|---|---|
| WO | 8803515 | 5/1988 |

* cited by examiner

MODULAR INDIVIDUAL WASTEWATER NUTRIENT REMOVAL SYSTEM

CROSS-REFERENCE TO RELATED APPLICATIONS

This application claims the benefits of U.S. Provisional Application No. 61/089,119 filed Aug. 15, 2008, and U.S. Provisional Application No. 61/090,290 filed Aug. 20, 2008, the disclosure of which is hereby incorporated by reference in its entirety including all figures, tables and drawings.

STATEMENT REGARDING FEDERALLY SPONSORED RESEARCH OR DEVELOPMENT

Not Applicable

REFERENCE TO SEQUENCE LISTING, A TABLE, OR COMPUTER PROGRAM LISTING COMPACT DISC APPENDIX

Not Applicable

TECHNICAL FIELD

The present invention is in the technical field of wastewater treatment processes. More particularly, the present invention is in the technical field of on-site, individual wastewater treatment using fixed-film biological nitrification and de-nitrification processes.

BACKGROUND OF THE INVENTION

Increased levels of nitrate and other nutrients in ground water have been documented in hundreds of locations throughout the United States. According to published reports, individual, on-site septic systems are a primary non-point source responsible for increased nitrate levels. Individual on-site septic systems in fractured bedrock aquifers are especially susceptible to elevated nutrient levels, as bedrock soils have limited ability to filter drainfield effluent. Also, recent studies have shown widespread evidence of pharmaceuticals and personal care products (PPCPs) in water resources. As populations tend to expand away from urban centers and toward the outer reaches of valley floors, the issue of elevated nutrient concentrations will become more important.

Nitrogen is present in many forms in a septic system. Most nitrogen excreted by humans is in the form of organic nitrogen (dead cell material, proteins, and amino acids) and urea. After entering the septic tank, microorganisms convert organic nitrogen to ammonia. Ammonia is the primary form of nitrogen leaving a standard septic system. Biological conversion of ammonia to nitrogen gas is a two-step process. Ammonia must first be oxidized to nitrate; nitrate is then reduced to nitrogen gas. These two reactions require significantly different environments.

Conversion of ammonia to nitrite and then to nitrate, is called nitrification. It is important to note that nitrification requires and consumes oxygen. The process is mediated by the bacteria *Nitrosomonas* and *Nitrobacter*, which require an aerobic environment for growth and metabolism of nitrogen. In a conventional septic system, most ammonia is converted to nitrate beneath the drainfield, where no further treatment occurs. As a result, nitrate is the primary contaminant of concern from on-site septic systems. As urban sprawl and rural development continues, domestic wells and surface water bodies are increasingly being impacted by nitrate from multiple septic system effluent.

The second step of the process, the conversion of nitrate to nitrogen gas, is referred to as de-nitrification. This process is also mediated by bacteria. For de-nitrification to occur, the dissolved oxygen level must be at or near zero. The bacteria also require a carbon food source for energy and conversion of nitrogen. The bacteria metabolize the carbonaceous material or biological oxygen demand (BOD) in the wastewater as this food source, metabolizing it to carbon dioxide. This in turn reduces the BOD of the sewage, which is desirable. However, if the sewage is already low in BOD, as is the case in the nitrification/de-nitrification process, the carbon food source will be insufficient for bacterial growth and de-nitrification will not proceed efficiently.

Nitrate can have serious human health effects if consumed in drinking water. Nitrate, other forms of nitrogen and phosphorus can have deleterious effects on the environment, as excess nitrogen stimulates the process known as eutrophication in surface water bodies. For this reason, many alternative technologies have been designed to remove total nitrogen from wastewater. See, for example, U.S. Pat. Nos. 7,485,228 B2; 7,462,285 B2; 7,445,715 B2; 7,407,580 B2; 7,332,077 B2; 7,297,276 B2; 7,147,776 B2; 7,144,509 B2; 7,082,893 B2; 7,081,203 B2; 7,077,952 B2 6,946,074 B2; 7,008,538 B2; 6,946,073 B2; 6,936,170 B2; 6,818,581 B2; 6,582,596 B2; 6,444,126 B1; 6,372,137 B1; 6,187,183 B1; 5,342,522; and 5,318,699 and U.S. Published Patent Application Nos. 2008/0210610 A1; and 2008/0156726 A1. See also, JP 54,107,153; and WO 1988/003515 as well as HU et al, Treatment of Wastewater with Modified Sequencing Batch Biofilm Reactor Technology, J. or Shanghai University, 2002, 6(3): 248-254. These technologies use bacteria to convert ammonia and nitrate to gaseous nitrogen. In this form, nitrogen is inert and may be released to the air. Most existing systems use inefficient trickling filters or have little active aeration and accomplish only about 70% to 80% nitrification.

Although systems have been developed to remove total nitrogen from wastewater. These systems are often difficult to administer and monitor, are intricate and complicated to install, and are inefficient. A need therefore remains for a simple system that effectively removes total nitrogen from wastewater.

All patents, patent applications, provisional patent applications and publications referred to or cited herein, are incorporated by reference in their entirety to the extent they are not inconsistent with the teachings of the specification.

BRIEF SUMMARY OF THE INVENTION

The invention involves a system to remove total nitrogen from wastewater. The modular configuration of the subject system allows components to be added to address contamination issues such as excess phosphorous. A treatment vault holds the components which include a nitrification bioreactor, a first settling tank, a de-nitrification bioreactor and a final settling tank. A flow equalization means insures constant flow to the system to prevent interruption from fluctuation in use. A biomass/solids return means sends solids or sloughed biomass collected in the settling tanks back to the septic tank.

BRIEF DESCRIPTION OF THE SEVERAL VIEWS OF THE DRAWING

The following provides a brief description of the drawings included for the present invention.

Figure 1:
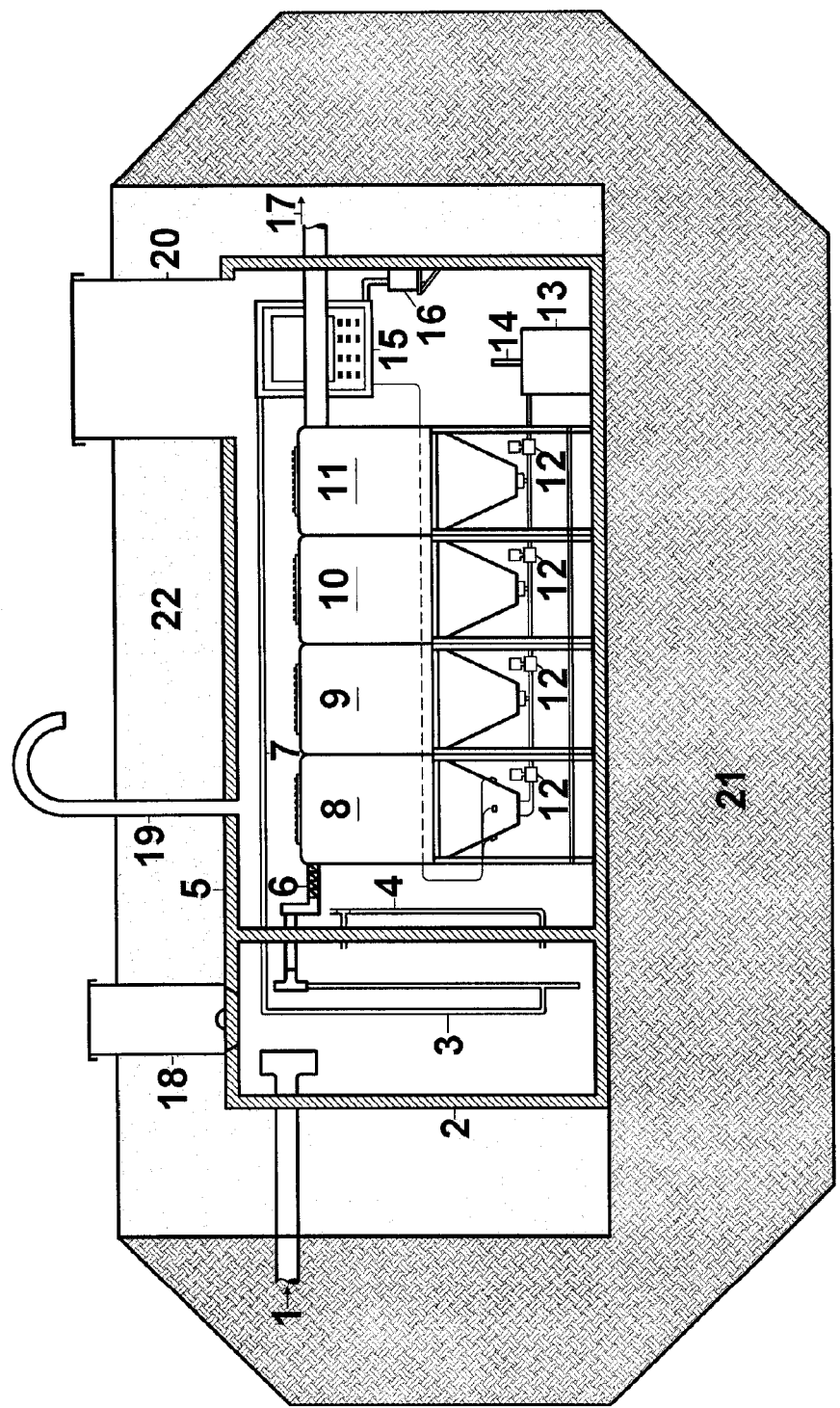
FIG. 1 is a cross-sectional view of a preferred embodiment of the system of the subject invention in position relative to the ground surface.

The following list provided a basic description of all the numbered items indicated in the drawings for the present invention.

| | |
|---|---|
| 1 | Pump Chamber inlet. |
| 2 | Pump Chamber. |
| 3 | Air-lift Pump. |
| 4 | Pump Chamber Level Indicator. |
| 5 | Underground Treatment Vault. |
| 6 | Flow Equalization Module. |
| 7 | Air Inflow into Air-lift Pump. |
| 8 | Nitrification Reactor. |
| 9 | Settling Tank. |
| 10 | De-nitrification Reactor. |
| 11 | Settling Tank. |
| 12 | Automated Valves. |
| 13 | Solids Return Pump. |
| 14 | Solids Return Line. |
| 15 | Control Panel. |
| 16 | Compressor/Air Pump. |
| 17 | Treated, De-nitrified Wastewater. |
| 18 | Pump Tank Riser and Access Way. |
| 19 | Air Intake Duct. |
| 20 | Treatment Vault Riser and Access Way. |
| 21 | Undisturbed Soil. |
| 22 | Compacted Soil Cover. |
| 23 | Wastewater Flow Path Through the Treatment System. |
| 24 | Air Line Bulkhead Fitting. |
| 25 | Wastewater Bulkhead Fitting. |
| 26 | Flow Equalization Constant Head Module. |
| 27 | Flow Equalization Air Blowout Port. |
| 28 | Flow Equalization Flow control Orifice. |
| 29 | Flow Equalization Manual Isolation Valve. |
| 30 | Influent Isolation Vent Module. |
| 31 | Nitrification Outflow Control Module. |
| 32 | Biomass/Solids Flow Path to Solids Return Pump. |
| 33 | Aeration Ports. |
| 34 | Plastic Bio-film Support Media. |
| 35 | Reactor Alignment and Connection Module (female). |
| 36 | Reactor Alignment and Connection Module (male). |
| 37 | Inflow Settling Baffle. |
| 38 | Settling Tank Outflow Control Module. |
| 39 | Reactor Inflow Connection Module (female). |
| 40 | Reactor Outflow Connection Module (male). |
| 41 | Carbon Based Bio-film Carriers. |
| 42 | Outer Grooves of a Bio-Based Carrier. |
| 43 | Outer Ridges of a Bio-Based Carrier. |
| 44 | Inner Ridges of a Bio-Based Carrier. |
| 45 | Inner Grooves of a Bio-Based Carrier. |
| 46 | Hollow Center of a Bio-Based Carrier. |
| 47 | End of a Bio-Based Carrier. |
| 48 | Inert Gas Injecting Means. |

DETAILED DESCRIPTION OF THE INVENTION

The present invention is a modular, on-site, wastewater treatment system designed to remove over 90% of total nitrogen, phosphorus, biological oxygen demand (BOD), and total suspended solids (TSS). The present invention combines the positive features of both aerobic and anaerobic systems to remove nitrogen along with contaminant specific modules to remove phosphorus and other contaminants as needed. The present invention uses a fixed-film, aerated bio-filter packed with small, buoyant, plastic growth media to convert ammonia to nitrate. The innovative design of this system allows for the complete conversion of ammonia to nitrate, while at the same time eliminating plugging and bio-fouling associated with the majority of existing technologies. In comparison, the present invention uses a compressor/air pump and submerged air diffusers to provide a consistent air flow to a packed-bed, fixed-film bio-reactor, thus achieving complete (99.7%) nitrification.

The nitrification process uses up the existing BOD in the wastewater stream, thus leaving a waste stream high in nitrate. Without an additional source of carbon, only 40% to 60% of total nitrogen can be removed from the system. To overcome this problem, the present invention incorporates an external source of organic carbon to achieve over 95% nitrate removal compared to 50% to 70% removal for the currently available systems which do not use organic carbon. The de-nitrification process also produces high quantities of biomass, thus leading to plugging and bio-fouling. The design of the reactors and the use of timed automated valves eliminate plugging and reduce maintenance of the system.

Other nutrients originating from on-site septic systems, mostly phosphorus, result in contamination of groundwater and surface water. The present invention is capable of addressing additional contaminants by adding modules to the existing system. Unlike current systems, the present invention can be easily modified after initial installation without additional excavation and costly system replacements.

A preferred embodiment of the modular system of the subject invention is shown in FIG. 1, septic tank effluent enters the pump chamber 2 through an inlet 1. In the exemplified embodiment, effluent enters by means of a gravity feed piping system. The size of the pump chamber 2 is determined by anticipated or actual water usage for the specific household for which it is installed. For example, a 500 gallon pump chamber insures approximately 1.5 times the average daily flow from a three bedroom house. An air-lift pump 3 located inside the pump chamber 2 provides a flow equalization module 6 with a supply of wastewater. The air inflow 7 into the airlift pump 3 is provided by a compressor/air pump 16. The flow equalization module 6 is designed to provide a constant flow rate to the treatment system, thus eliminating the adverse effects resulting from variations in flow rates throughout the day. In the exemplified embodiment, the entire treatment system is housed in an underground treatment vault 5. The underground treatment vault 5 and the pump chamber 2 are made of materials suitable to protect the system components, and include, but are not limited to, pre-cast concrete and molded plastic. The pump chamber 2 can be separate from or integral with the treatment vault 5. The treatment vault is sized to house all the components of the treatment system and to provide reasonable access to service and maintain the system. The underground treatment vault 5 and the attached pump chamber 2 are placed on leveled, undisturbed soil 21 in the excavation. Once in the excavation, the underground treatment vault 5 and the pump chamber 2 are covered with compacted soil 22. The water level in the pump chamber 2 is monitored and controlled by the pump chamber level indicator 4. The pump chamber level indicator 4 provides continuous water level reading to the control panel 15, which controls the opening of and closing of the automated valves 12 located beneath each reactor vessel. When the water level in the pump chamber 2 is drawn down to a pre-determined level, the automated valve 12 located under the final settling tank 11 will open, thus placing the system in recirculation mode. As the water in the pump chamber 2 rises to a pre-determined level, the automated valve 12 located under the final settling tank 11 will close thus removing the system from recycle mode. If the water in the pump chamber 2 rises above a predetermined level, an alarm will be triggered. Water leaving the flow equalization module 6 enters the nitrification reactor 8 where it is aerated using air provided by the compressor/air pump 16. Within the nitrification reactor 8 ammonia and organic nitrogen are converted to nitrate. The effluent from the nitrification reactor 8 flows by gravity to the first settling tank 9 where any solids and biomass settle to the bottom of the cone shaped tank. The effluent from the first settling tank 9 flows by gravity to the de-nitrification reactor 10 where nitrate is reduced to nitrogen gas. The de-nitrification reactor 10 is filled with a carbon-based bio-film carrier which allows for complete conversion of nitrate to nitrogen gas. The effluent from the de-nitrification reactor 10 flows by gravity to a final settling tank 11 where any solids or biomass settle to the bottom of the cone shaped tank. Solids, water, and sloughed off biomass leaving the reactors through the automated valves 12 enter the solids return pump 13 which are returned to the septic tank by means of the solids return to septic tank line 14. Treated, de-nitrified wastewater 17 leaving the final settling tank 11 flows by gravity to a drain field or grey water storage tank. Access to the pump chamber is gained through the pump tank riser and access way 18. Access to the underground treatment vault is gained through the treatment vault riser and access way 20.

Figure 2:
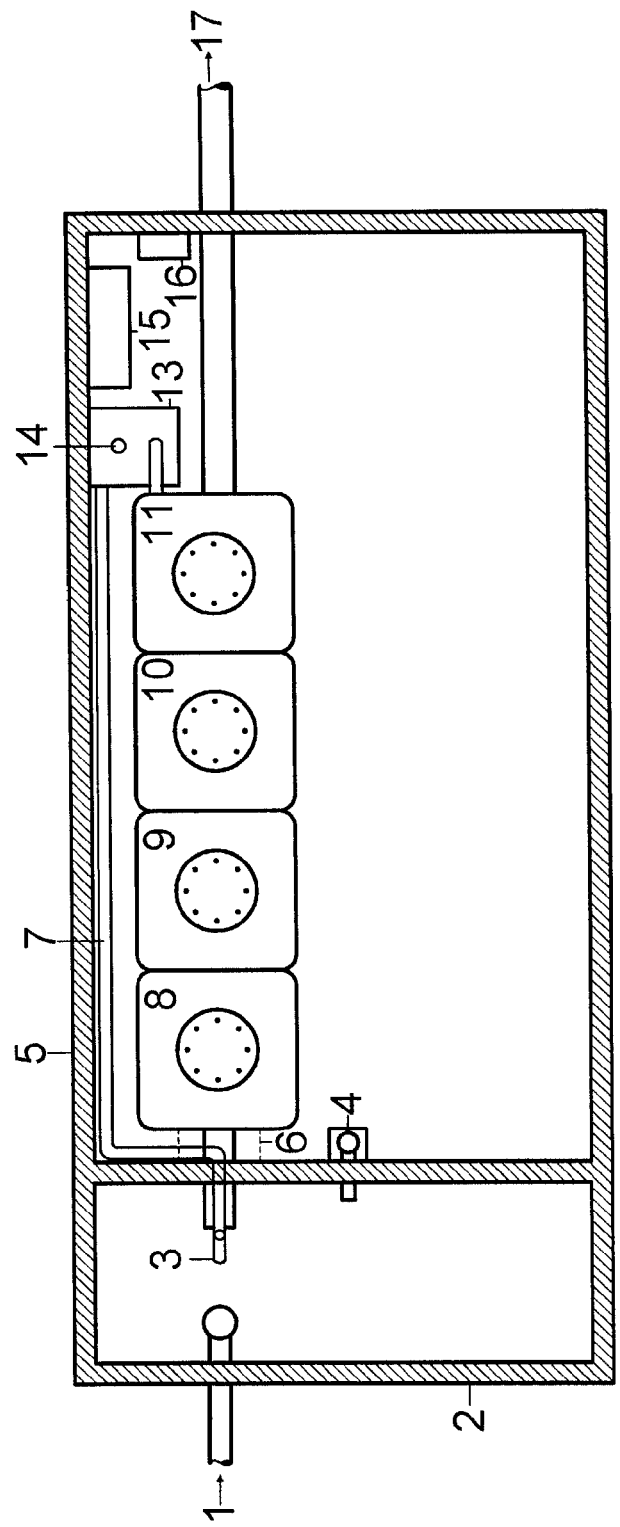
FIG. 2 is a schematic of the top view of a preferred embodiment of the subject invention.

A top view of a preferred embodiment of the system of the subject invention is shown in FIG. 2. The top view shows the layout in the underground treatment vault 5. The treatment reactors; the nitrification reactor 8; the first settling tank 9; the de-nitrification reactor 10; and the final settling tank 11 are identical in shape and size and fit together tightly by means of devices described in future figures. The design of the reactors enables the entire system to be modular in nature thus providing the potential to add or subtract components as needed for particular treatment needs.

Figure 3:
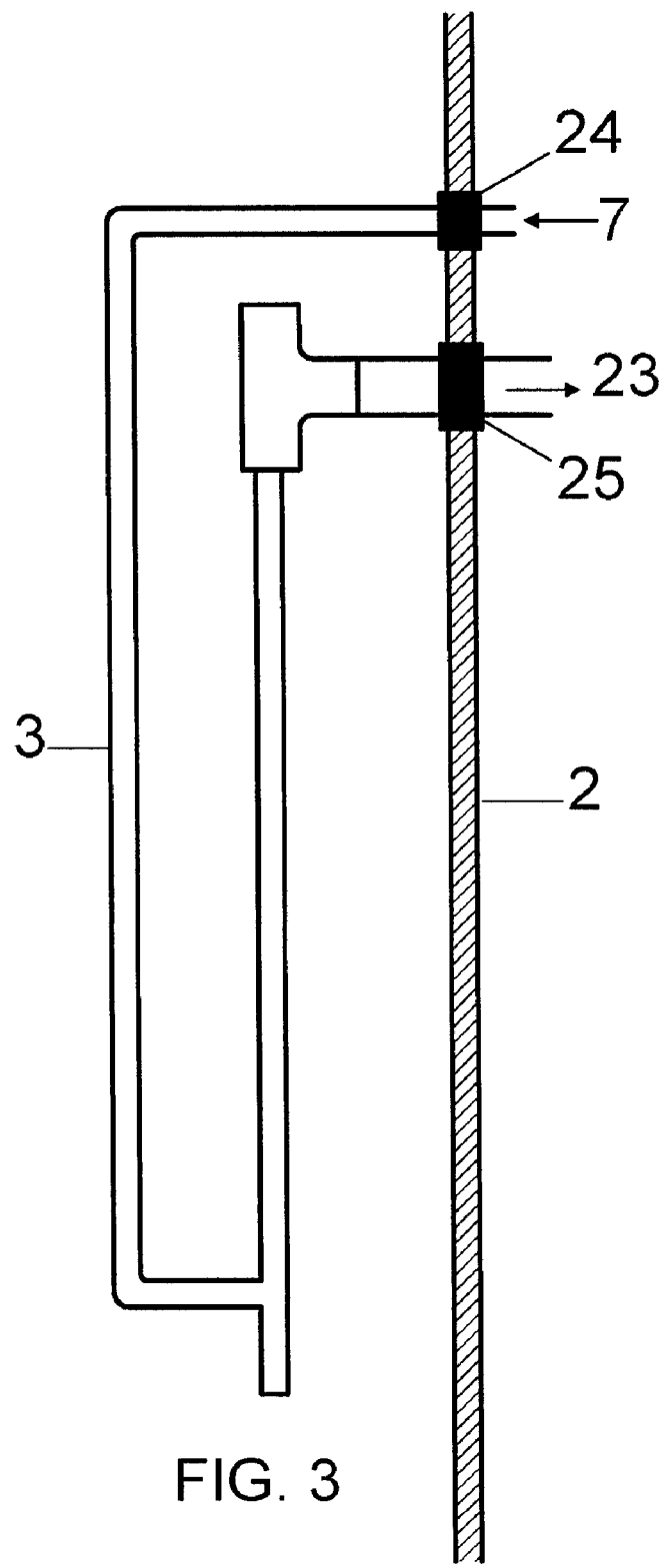
FIG. 3 is a detailed schematic of a preferred embodiment of an air lift pump apparatus of the system of the subject invention.

In a particularly preferred embodiment, an air-lift pump 3 is used to provide a constant flow of wastewater to the system of the subject invention (FIG. 3). The air-lift pump 3 is attached to the pump chamber 2 by means of an air line bulkhead fitting 24 and a wastewater bulkhead fitting 25. Air inflow into the air-lift pump 7 lifts the water in the air-lift pump 3 and sends the wastewater flowing through the treatment system 23. The air-lift pump works with the compressor/air pump 16 and eliminates the need for an additional mechanical pump making the system simpler and more energy efficient.

Figure 4:
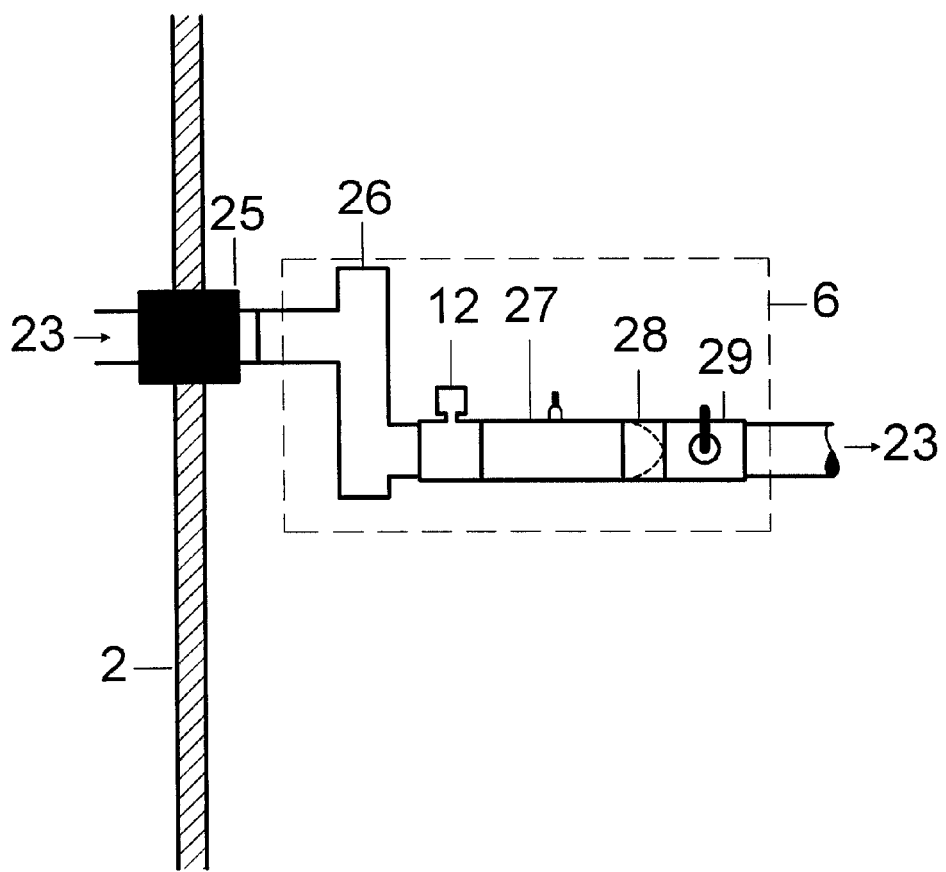
FIG. 4 is a detailed schematic of a preferred embodiment of a flow equalization module of the system of the subject invention.

The flow equalization module of the subject system provides a constant flow of wastewater through the treatment system 23. The constant flow allows for more efficient treatment of the wastewater by eliminating surges and slack flows in the reactor vessels. A preferred embodiment of the flow equalization module 6 is shown in FIG. 4. A constant head module 26 is placed in line with; an automated valve 12; an air blowout port 27; a flow control orifice 28; and a manual isolation valve 29. The flow equalization constant head module 26 supplies water to the remaining components at a constant head thus allowing for consistent flow parameters of the wastewater. The automated valve 12 is controlled by the control system and closed to allow the flow control orifice 28 to be blown free of any solids that may plug the system. The air blow out port 27 provides bursts of compressed air to maintain proper operation of the flow control orifice 28. The flow control orifice 28 is sized based on the required flow rate and the head provided by the constant head module 26. The flow control orifice 28 can be changed as needed to meet flow requirements, thus providing a constant flow of wastewater to the treatment system 23. Although a preferred embodiment of the flow equalization module is described, one skilled in the art recognizes that there are a number of other valve and controller configurations that will provide constant flow to the system.

Figure 5:
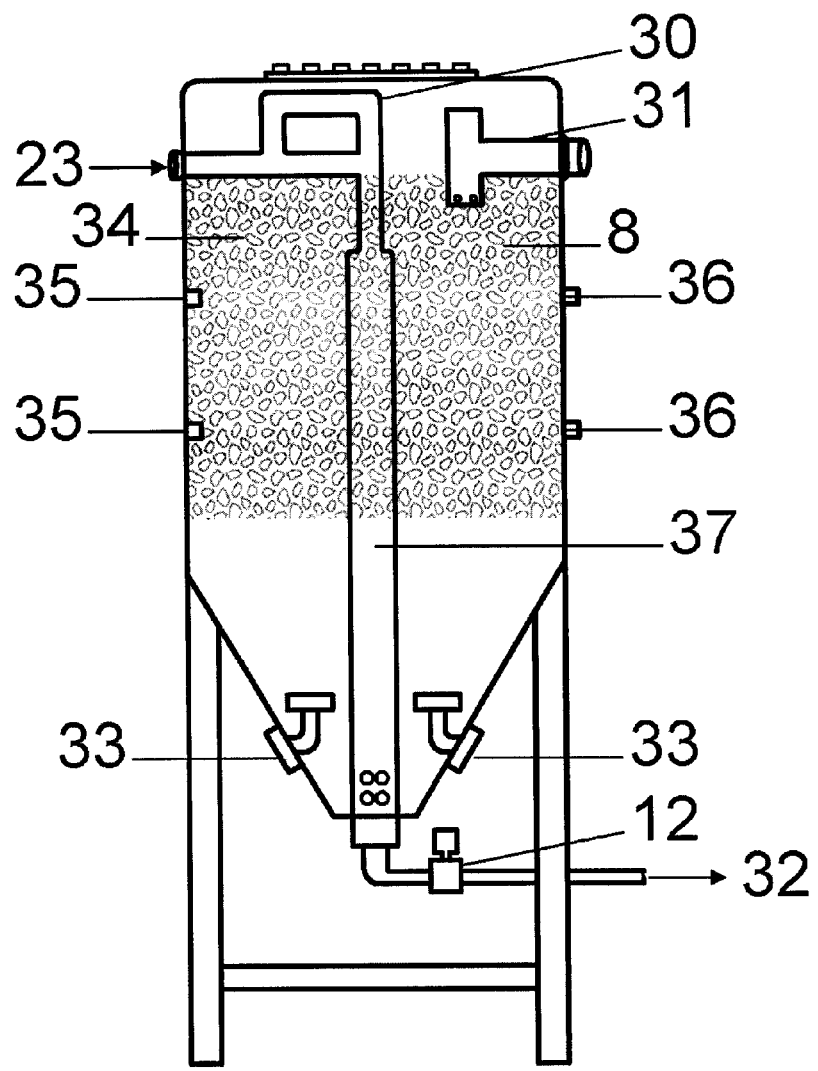
FIG. 5 is a detailed schematic of a preferred embodiment of a nitrification reactor of the system of the subject invention.

A preferred embodiment of the nitrification reactor 8 is shown in FIG. 5. It is a fixed film, aerated, flooded packed column bioreactor designed to convert ammonia to nitrate. In the nitrification reactor 8, wastewater to the treatment system 23 enters the reactor and flows downward through the inflow settling baffle 37. The influent isolation vent module 30 prevents air in the nitrification reactor from interfering with the waste water flow in the nitrification reactor 8. The wastewater to the treatment system 23 then travels upward through the reactor where it is aerated by means of aeration ports 33. The air is produced by an air pump 16 and is dispersed through the aeration ports 33. As the wastewater and air progress through the nitrification reactor 8, plastic bio-film support media 34 are encountered. The nitrification process is mediated by the bacteria *Nitrosomonas* and *Nitrobacter* which require an aerobic environment for growth and metabolism of nitrogen. Thus, the nitrification process must proceed under aerobic conditions. The hydraulic retention time (HRT) needed for complete conversion of ammonia to nitrate ranges from 0.5 to 4 hours, depending on the filter media, the airflow, and the influent ammonia concentration. The bacteria need a place to live and grow, thus, the plastic bio-film support media 34 found in nitrification reactor 8. The agitation from the air keeps the bio-film healthy and prevents clogging. The biomass-laden nitrified wastewater exits through a nitrification outflow control module 31 near the top of the nitrification reactor 8. Excess biomass/solids are removed using an automated valve 12 located at the bottom of the nitrification reactor 8 which is used for cleaning the column and standby mode operation. In a particularly preferred embodiment, the nitrification reactor 8 is constructed of a cone-bottom plastic tank with custom fittings and piping systems. The nitrification reactor 8 includes female reactor alignment and connection modules 35 and male alignment and connection modules 36 which allows the reactors in the system to be snapped together, thus creating a modular treatment system capable of numerous configurations designed to meet various water treatment needs.

Figure 6:
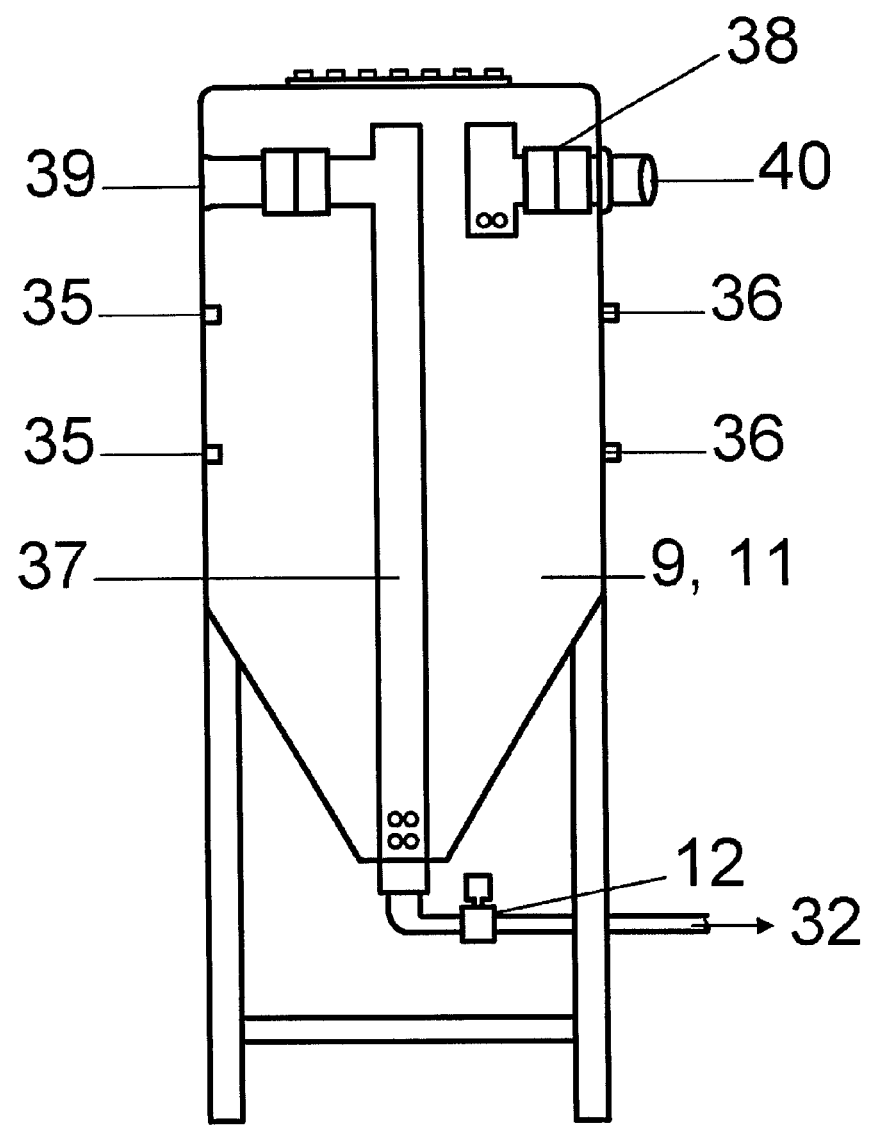
FIG. 6 is a detailed schematic of a preferred embodiment of an initial and final settling tank of the system of the subject invention.

The initial settling tank 9, and the final settling tank 11 remove solids produced in the nitrification reactor 8, and the de-nitrification reactor 10, respectively. A preferred embodiment of these settling tanks is shown in FIG. 6. Nitrified wastewater with sloughed bio-film 27 enters through the top of the clarifier/settling tank 8 through a port via gravity flow and flows downward through the reactor settling baffle 37. The settling tanks are designed to remove any sloughed off bio-film from the nitrification/de-nitrification process. An automated valve 12 located at the bottom of the settling tanks is used to remove excess biomass solids collected during system operation. Preferably, the settling tanks include female reactor alignment and connection modules 35 and male alignment and connection modules 36 which allow the reactors in the system to be snapped together, thus creating a modular treatment system capable of numerous configurations designed to meet various water treatment needs. The piping from each reactor is equipped with a female reactor inflow connection module 39 and a male reactor outflow connection module 40 that allow a watertight seal to be formed between each successive reactor.

Figure 7:
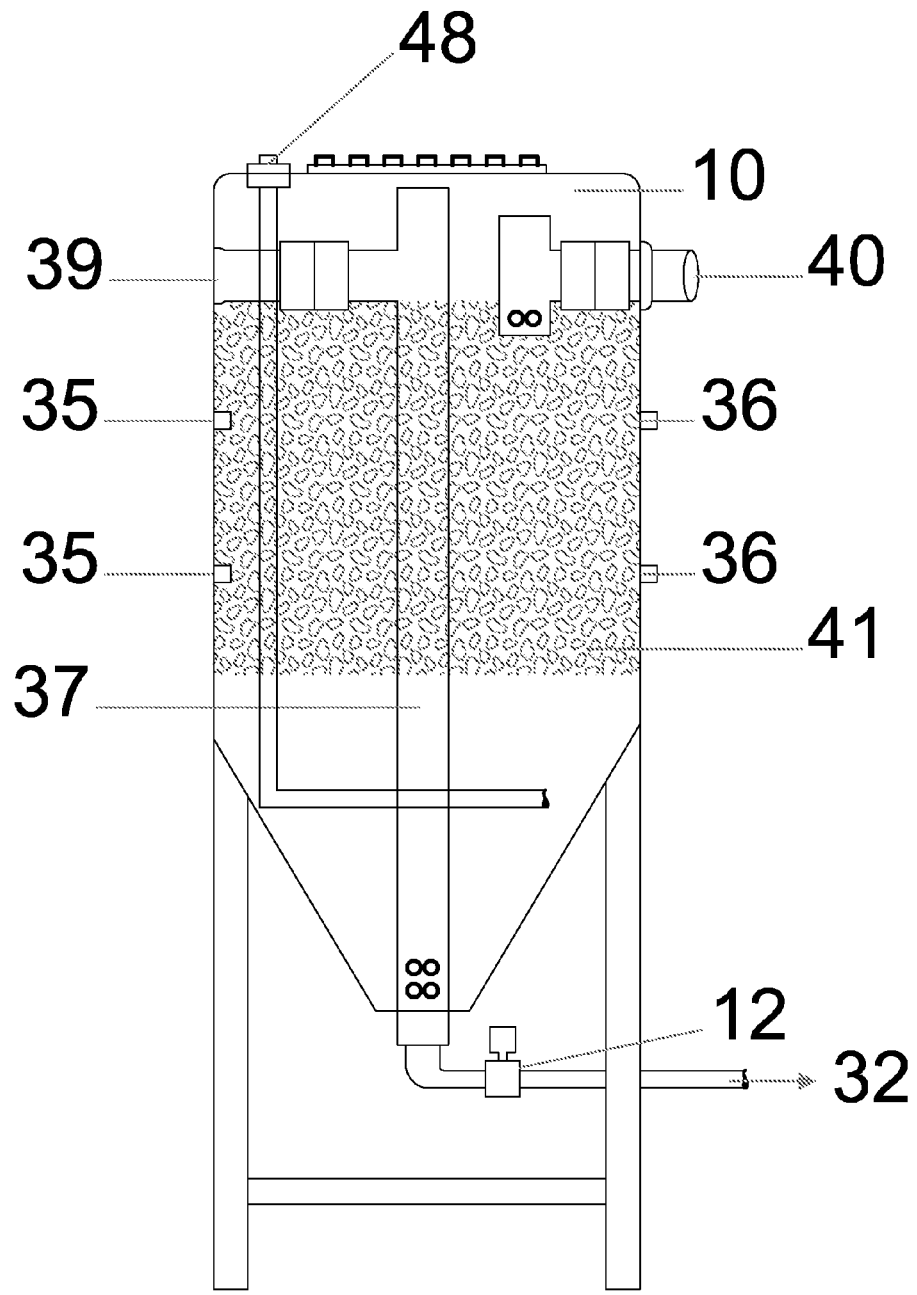
FIG. 7 is a detailed schematic of a preferred embodiment of a de-nitrification reactor of the system of the subject invention.

The de-nitrification reactor 10 fixed film bioreactor converts nitrate to nitrogen gas. A preferred embodiment of a de-nitrification reactor useful in the system of the subject invention is shown in FIG. 7. The de-nitrification process is mediated by bacteria. For the reduction of nitrate to nitrogen gas to occur, the dissolved oxygen level must be at or near zero; the de-nitrification process must proceed under anaerobic conditions. The bacteria also require a carbon food source for energy and conversion of nitrogen. The bacteria metabolize the carbonaceous material or BOD in the wastewater as this food source, metabolizing it to carbon dioxide. Also, because any available organic carbon in the system was used up during the nitrification process an external source of organic carbon is necessary for complete de-nitrification. Methanol and/or other materials are suitable for use as the carbon source for de-nitrification. Preferably, carbon-based bio-film carriers 41 are used as the carbon source for de-nitrification. Nitrified wastewater enters through the de-nitrification reactor 10 and flows downward through the inflow settling baffle 37. An inert gas, applied through an inert gas injecting means, is used to agitate the bio-film support media on an annual basis to prevent clogging and to ensure a healthy bio-film. An automated valve 12 located at the bottom of the de-nitrification reactor 10 is used to remove excess biomass solids collected during system operation. The de-nitrified wastewater exits near the top of the de-nitrification reactor 10 and flows by gravity to the final settling tank 11. Preferably, the de-nitrification reactor 10 includes female reactor alignment and connection modules 35 and male alignment and connection modules 36 which allow the reactors in the system to be snapped together, thus creating a modular treatment system capable of numerous configurations designed to meet various water treatment needs. The piping from each reactor should be equipped with a female reactor inflow connection module 39 and a male reactor outflow connection module 40 that allows a watertight seal to be formed between each successive reactor.

As mentioned above, in a preferred embodiment, carbon-based biofilm carriers are used as a carbon source in the de-nitrification reactor. In a particularly preferred embodiment, these carriers are solid, carbon-based biofilm support media comprising combinations of saturated fatty acids, saturated fatty alcohols, and other biodegradable solids shaped in such a manner to allow for maximum surface and maximum protection during the biological treatment of water. The carbon-based biofilm carriers 41 are made entirely of various combinations of saturated fatty alcohols and/or saturated fatty acids with at least 14 carbon atoms and no more than 26 carbon atoms. Acids and alcohols suitable for use in the construction of these carriers include, but are not limited to: myristic (tetradecanoic) acid; palmitic (hexadecanoic) acid; stearic (octadecanoic) acid; arachidic (eicosanoic) acid; behenic (docosanoic) acid; lignoceric (tetracosanoic) acid; myristyl alcohol (1-tetradecanol); cetyl alcohol (1-hexadecanol); stearyl alcohol (1-octadecanol); arachidyl alcohol (1-eicosanol); behenyl alcohol (1-docosanol); lignoceryl alcohol (1-tetracosanol); and ceryl alcohol (1-hexacosanol). Other biodegradable solids suitable for use in the construction of the subject carriers include, but are not limited to, sawdust, woodchips, cellulose acetate polymers, and biodegradable plastics. The carbon-based biofilm carriers 41 are formed by extrusion, injection, and/or cast molding techniques.

Figure 8:
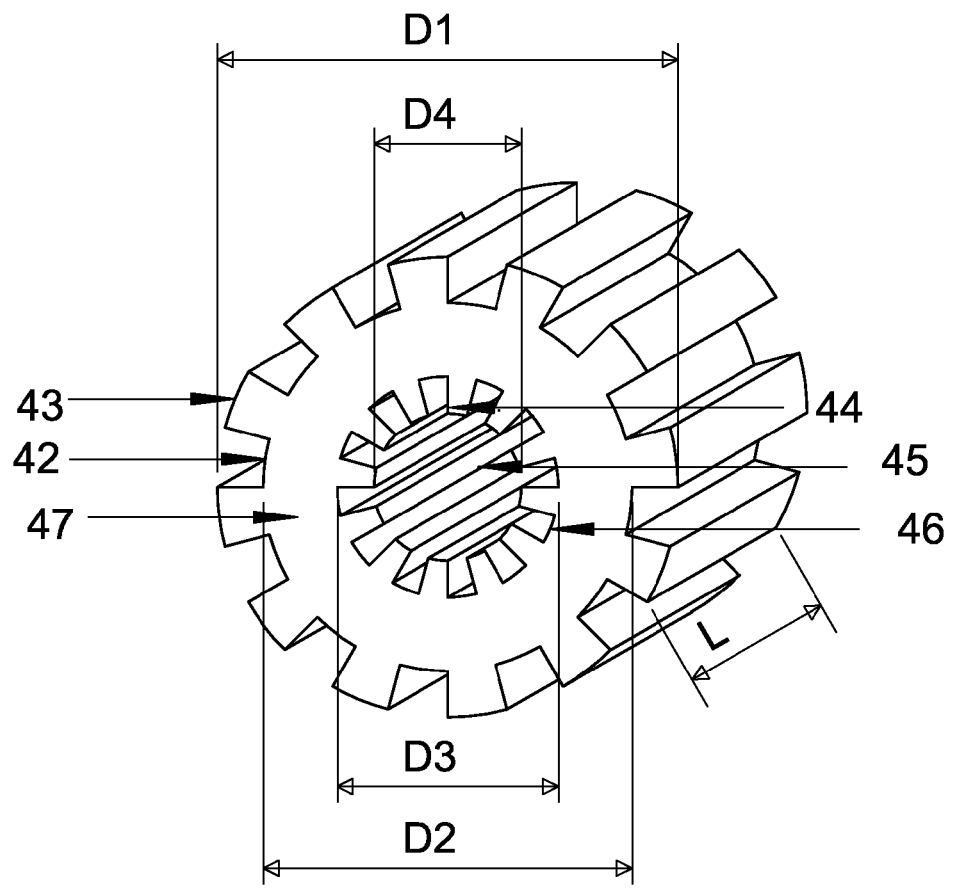
FIG. 8 is a perspective view of a preferred embodiment of a carbon-based biofilm carrier of the system of the subject invention.

In a specific embodiment (FIG. 8), the shape of these carriers is a hollow cylinder, hollow disk, or partial hollow sphere where the length of the carrier ranges from about 0.3 to about 1.5 times the maximum outside diameter. The specific surface area is not less than 500 $m^2/m^3$ and reaches a maximum of approximately 1,500 $m^2/m^3$. The carriers 41 have outer grooves 42, outer ridges 43, inner ridges 44, inner grooves 46, and a hollow center 45. The outer grooves, outer ridges, inner ridges and inner grooves extend the entire length or thickness of the carbon-based biofilm carrier and provide adequate surface area for microorganisms to attach to the carbon-based biofilm carrier 41 and provide environments suitable for a wide variety of organisms requiring different conditions. Although the nitrification and de-nitrification processes are separated in the system of the subject invention, the exemplified carrier supports both aerobic and anaerobic growth. For example, in an aerated reactor, the outer ridges 43, the outer grooves 42, and the ends 47 of the carbon-based biofilm carriers 41 prove an ideal environment for nitrifying bacteria, while at the same time, the inner ridges 44 and the inner grooves 46 of the hollow center 45 provide an anaerobic environment for de-nitrifying bacteria.

A control panel 15 is installed to control the system components as needed. The control panel 15 is made up of switches, relays, timers, and other electronic devices and provides ultimate control of the system. The alarm/monitoring system provides the owner/service provider with feedback as to the system's performance. The system of the subject invention can be housed in an underground vault as shown in the exemplified embodiment, or in an insulated, above ground shed that is just large enough for the required components of the system. A mobile unit housing the subject system could provide temporary wastewater treatment. An advantage of the module system is that it has a small footprint, approximately, six feet by eight feet, yet provides ample room for expansion to the modular system and access to service providers. Depending on the climate heating elements for the system can be incorporated. A service provider/system installer should be the only one with access to the wastewater treatment system. Additional components, including solar and/or other renewable resource devices may be incorporated depending on the environment and customer use patterns. Also, because the system is modular, other compounds can be removed from the wastewater stream by changing or adding specific resins or media to the columns in the final clarifier.

The preferred embodiment of the subject system is fully automated and low maintenance. The system will require annual inspection to replenish organic carbon sources, which is standard for such technologies. The innovative reactor design and control system eliminates reactor plugging and bio-fouling. The system has a three to five year compressor rebuild schedule. There is the possibility of remote monitoring capabilities of system performance. The subject system also has low energy requirements. It requires only one small air pump and one small biomass/solids pump. The system uses four electric solenoid valves to control solids, one low voltage timing device, and has a total power requirement of less than 500 watts. Less maintenance is required since the system has simple controls. For example, the gravity flow requires only one small pump controlled by the pump chamber level indicator. The solenoid valves are controlled by a simple timer and the high level and low level alarms are controlled by simple float switches.

It is understood that the foregoing examples are merely illustrative of the present invention. Certain modifications of the articles and/or methods employed may be made and still achieve the objectives of the invention. Such modifications are contemplated as within the scope of the claimed invention.

The invention claimed is:

1. A system for treating wastewater comprising, in line:
   a pump chamber comprising an inlet to receive wastewater from a wastewater source;
   a means to equalize flow to provide a constant flow of wastewater to the system;
   an aerated nitrification bioreactor;
   an initial settling tank;
   a de-nitrification bioreactor;
   a final settling tank; and
   a means for returning biomass to the wastewater source.

2. The system of claim 1, further comprising an air lift pump in said pump chamber and a compressor/air pump.

3. The system of claim 1, wherein said means to equalize flow comprises, in line: a constant head module; an automated valve; and air blowout port; a flow control orifice; and a manual isolation valve.

4. The system of claim 1, wherein said nitrification reactor comprises a cone-shaped base terminating in an automated valve, settling baffles, a nitrifying biofilm and aerating means to provide oxygen to the nitrifying biofilm and to agitate contents of said nitrification bioreactor.

5. The system of claim 1, wherein said initial settling tank and said final settling tank comprise settling baffles.

6. The system of claim 1, wherein said de-nitrification bioreactor comprises a cone-shaped base terminating in an automated valve, settling baffles, a plurality of de-nitrifying biofilms on carbon-based biofilm carrier elements, and a means to inject inert gas to agitate contents of said de-nitrification bioreactor.

7. The system of claim 6, wherein said carbon-based biofilm carrier elements comprise carbon-based materials selected from the group consisting of saturated fatty acids, saturated fatty alcohols, sawdust, cellulose based acetate polymers, and biodegradable plastics, the carrier elements having a hollow center.

8. The system of claim 7, wherein said carrier elements are in a shape selected from the group consisting of a hollow cylinder, a hollow disk, and a hollow partial sphere, and the length of the elements is from about 0.3 times to about 1.5 times the outer diameter of the elements.

9. The system of claim 7, wherein said carrier elements further comprise outer ridges, outer grooves, inner ridges, and inner grooves.

10. The system of claim 9, wherein said Outer grooves are from about 0.75 to about 0.09 of said outer diameter of said carrier elements, and said inner grooves are from about 0.40 to about 0.50 of said outer diameter of said carrier elements, and said inner ridges are about 0.30 to about 0.40 of said outer diameter of said carrier elements.

11. The system of claim 7, wherein said saturated fatty acids and said saturated fatty alcohols each comprise at least 16 carbon atoms and comprise less than 26 carbon atoms.

12. The system of claim 7, wherein said saturated fatty acids and said saturated fatty alcohols are selected from the group consisting of myristic (tetradecanoic) acid; palmitic (hexadecanoic) acid; stearic (octadecanoic) acid; arachidic (eicosanoic) acid; behenic (docosanoic) acid; lignoceric (tetracosanoic) acid; myristyl alcohol (1-tetradecanol); cetyl alcohol (1-hexadecanol); stearyl alcohol (1-octadecanol); arachidyl alcohol (1-eicosanol); behenyl alcohol (1-docosanol); lignoceryl alcohol (1-tetracosanol); and ceryl alcohol (1hexacosanol).

13. The system of claim 1, wherein said means for returning said biomass to said wastewater source comprises a pump and piping.

14. The system of claim 1, wherein said source of wastewater is a septic tank.

15. The system of claim 1, wherein said at least two of said nitrification bioreactor, said initial settling tank, said de-nitrification bioreactor, and said final settling tank are modular and each comprise female alignment and connection modules and male alignment and connection modules.

16. The system of claim 1, further comprising a control panel.

17. The system of claim 1, wherein said means to equalize flow to provide a constant flow of wastewater to the system, said aerated nitrification bioreactor, said initial settling tank, said de-nitrification bioreactor, said final settling tank, and said means for returning biomass to the wastewater source are housed within a vault.

18. A system for treating wastewater comprising, in line:
   a pump chamber comprising an inlet to receive wastewater from a wastewater source;
   a means to equalize flow to provide a constant flow of wastewater to the system, the equalization means comprising an compressor/air pump and an air lift pump, and in line, a constant head module, an automated valve, and air blowout port, a flow control orifice, and a manual isolation valve;
   an aerated nitrification bioreactor comprising a cone-shaped base terminating in an automated valve, settling baffles, nitrifying biofilm, and aerating means to provide oxygen to the nitrifying biofilm and to agitate contents of said nitrification bioreactor;
   an initial settling tank comprising settling baffles;
   a de-nitrification bioreactor comprising a cone-shaped base terminating in an automated valve, settling baffles, a plurality of de-nitrifying biofilms on carbon-based biofilm carrier elements, and a means to inject inert gas to agitate contents of said de-nitrification bioreactor, wherein said carrier elements comprise carbon-based materials selected from the group consisting of saturated fatty acids, saturated fatty alcohols, sawdust, cellulose based acetate polymers, and biodegradable plastics, the carrier elements are in a shape selected from the group consisting of a hollow cylinder, a hollow disk, and a hollow partial sphere, and the length of the elements is from about 0.3 times to about 1.5 times the outer diameter of the elements, the carrier elements further comprise outer ridges, outer grooves, inner ridges, and inner grooves, and the saturated fatty acids and said saturated fatty alcohols each comprise at least 16 carbon atoms and comprise less than 26 carbon atoms;
   a final settling tank comprising settling baffles; and
   a means for returning biomass to the wastewater source comprising a pump and tubing.

19. The system of claim 18, wherein said at least two of said nitrification bioreactor, said initial settling tank, said de-nitrification bioreactor, and said final settling tank are modular and each comprise female alignment and connection modules and male alignment and connection modules.

20. The system of claim 18, wherein said means to equalize flow to provide a constant flow of wastewater to the system, said aerated nitrification bioreactor, said initial settling tank, said de-nitrification bioreactor, said final settling tank, and said means for returning biomass to the wastewater source are housed within a vault.

* * * * *